US007000194B1

(12) United States Patent
Newbold

(10) Patent No.: US 7,000,194 B1
(45) Date of Patent: Feb. 14, 2006

(54) METHOD AND SYSTEM FOR PROFILING USERS BASED ON THEIR RELATIONSHIPS WITH CONTENT TOPICS

(75) Inventor: David L. Newbold, West Roxbury, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/401,581

(22) Filed: Sep. 22, 1999

(51) Int. Cl.
 *G06F 17/00* (2006.01)
(52) U.S. Cl. ............... 715/789; 715/513; 715/811; 715/512; 705/6
(58) Field of Classification Search .............. 707/500; 345/745, 811, 789, 747; 705/1, 7, 8, 10, 705/11, 51, 6; 715/500.1, 789, 513, 811
See application file for complete search history.

(56) References Cited

U.S. PATENT DOCUMENTS

| 6,356,898 B2 * | 3/2002 | Cohen et al. ............. 707/5 |
| 6,480,835 B1 * | 11/2002 | Light ........................ 707/3 |
| 6,560,588 B1 * | 5/2003 | Minter ....................... 706/50 |

* cited by examiner

*Primary Examiner*—Stephen Hong
*Assistant Examiner*—Matthew Ludwig
(74) *Attorney, Agent, or Firm*—Brown Raysman Millstein Felder & Steiner LLP

(57) ABSTRACT

An affinity generation system according to the present invention analyzes a profiled user's authorship and document usage within an 'intranet' to create a set of affinities between documents and topical classifications used in a hierarchical content catalog. These affinities are weighted depending on the system usage and amount of collected evidence. Once a certain threshold has been reached, the threshold being fixed or dynamically set to achieve a desired policy, the affinities are published into the content catalog. The user looking for specific expertise can then search or browse the content catalog and find both documents and people with strong affinities to the selected content area.

8 Claims, 8 Drawing Sheets

Fig 4

1-20 of 27 results for "Javascript"

| | Date | Title |
|---|---|---|
| 98% | 12/11/97 | About setting "Use JavaScript when generating pages." |
| 92.1% | 08/18/98 | Why do I get a Java or script error when I start the Web Administrator |
| 83.4% | 09/12/95 | Database properties-Basics Tab |
| 61.2% | 07/12/97 | Notes and Web templates |
| 49.1% | 03/04/98 | Target attribute to @URLOpen does not always throw errors |
| 31.4% | 07/12/97 | Detail: searching text within pages in the database |
| 26.4% | 12/12/97 | About customizing the Submit button for Web forms |

~150

Previous  Next

| Rank | Name |
|---|---|
| 1 | John F. Greco |
| 2 | Jim S. Smith |
| 3 | Joan M. Johnson  ~160 |
| 4 | Sally P. Forth |

Fig 5

Expert Locator

John F. Greco
(212) 997-6015
Technology Attorney
Brown Raysman Millstein Felder & Steiner LLP Attorney, Electrical Engineer Manager: Seth H. Ostrow Last Update: 9/22/99

● chat ■ email — 180

I am available □ — 190

| | |
|---|---|
| Skills/Expertise | Javascript, C++, Legalese |
| Personal Info. | Email Address — jcreco@brownrasman.com |
| | Phone Numbers — (212) 887-6015 |
| | Assistant — Mitsu Harugachi |
| | Current Location — New York, New York |

□ Business Card

170

METHOD AND SYSTEM FOR PROFILING USERS BASED ON THEIR RELATIONSHIPS WITH CONTENT TOPICS

RELATED APPLICATIONS

This application is related to commonly owned application Ser. No. 09/192,047, now U.S. Pat. No. 6,377,983 titled METHOD AND SYSTEM FOR CONVEYING EXPERTISE BASED ON DOCUMENT USAGE, filed Nov. 13, 1998, which is hereby incorporated by reference into this application.

This application is related to commonly owned application Ser. No. 09/191,587, now U.S. Pat. No. 6,356,898, titled METHOD AND SYSTEM FOR SUMMARIZING TOPICS OF DOCUMENTS BROWSED BY A USER, filed Nov. 13, 1998, which is hereby incorporated by reference into this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to cooperative computing environments and information retrieval and management methods and systems. More particularly, the present invention relates to methods and systems for capturing and generating useful information about a user's access and use of data on a computer system, such as in the form of documents stored on remote servers, and making such useful information available to others.

Most organizations that have grown past a few hundred employees have some form of directory and usually have made some attempt to augment this directory with personal profile attributes such as memberships, position title or project affiliations. Many have attempted to expand each person's profile by adding skills inventory, educational background or professional accomplishments. Many of these efforts have been successful, but most have not fulfilled their promise. The effort required to update and maintain such a profile and the subjective nature of self description leads to inaccuracies or stale data.

Most such "people finder" systems fail due to the lack of timely updates to the expert's profiles. In addition, many knowledgeable workers do not consider their experience to be valuable to others and may overlook this when manually completing profile forms. The result is that most manually built expertise locator systems are irrelevant or become outdated and eventually fail.

There is therefore a need for a system for automatically and dynamically identifying people as having affinity to or being experts in various topics or content and making this information known to others.

SUMMARY OF THE INVENTION

It is an object of the present invention to solve the problems described above with existing people finder systems.

It is another object of the present invention to automate a process of locating people within an organization having some expertise in a topic.

Some of the above and other objects are achieved by a method, system and computer program for profiling a user based on the user's activity. The method involves assigning one or more topics to each of a plurality of documents based at least in part upon content contained in the documents, maintaining an affinity variable associated with the user for each of one or more of the topics assigned to a document attributed to the user, determining whether a first affinity variable for the user for a given topic has reached a threshold, and associating the user with the given topic for the first affinity variable which reaches the threshold.

In some embodiments, an affinity generation system according to the present invention analyzes a profiled user's authorship and document usage within an 'intranet' to create a set of affinities between documents and topical classifications used in a hierarchical content catalog. These affinities are weighted depending on the system usage and amount of collected evidence. Once a certain threshold has been reached, the threshold being fixed or dynamically set to achieve a desired policy, the affinities are published into the content catalog. The user looking for specific expertise can then search or browse the content catalog and find both documents and people with strong affinities to the selected content area.

The affinity generation system is used to populate and maintain a person's interest and skills profile. This profile can be a part of a corporate directory system or an independent repository. The profile is used initially as part of a 'people finder system' to locate expertise within an organization, but can also be exploited to assist in the creation of ad hoc work teams, review boards, etc. in addition to a general analysis of skills and expertise assets within an organization.

The affinity generation system uses automation to create and maintain both the user profiles and published affinities. In addition, the leveraged use of an accepted hierarchical content catalog and the multidimensional content classification scheme insures an accurate set of topical affinities that are easy to relate to the activities of the organization.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 4 is an exemplary screen display showing results from a search through the content catalog shown in FIG. 1 for a selected topic; and FIG. 5 is an exemplary screen display showing a user profile linked to the search results screen shown in FIG. 4.

DETAILED DESCRIPTION OF THE PREFERRED EMBODIMENTS

The preferred embodiments of a system, method, and article of manufacture containing software programs in accordance with the present invention are described with reference to the drawings in FIGS. 1–5.

Figure 1:
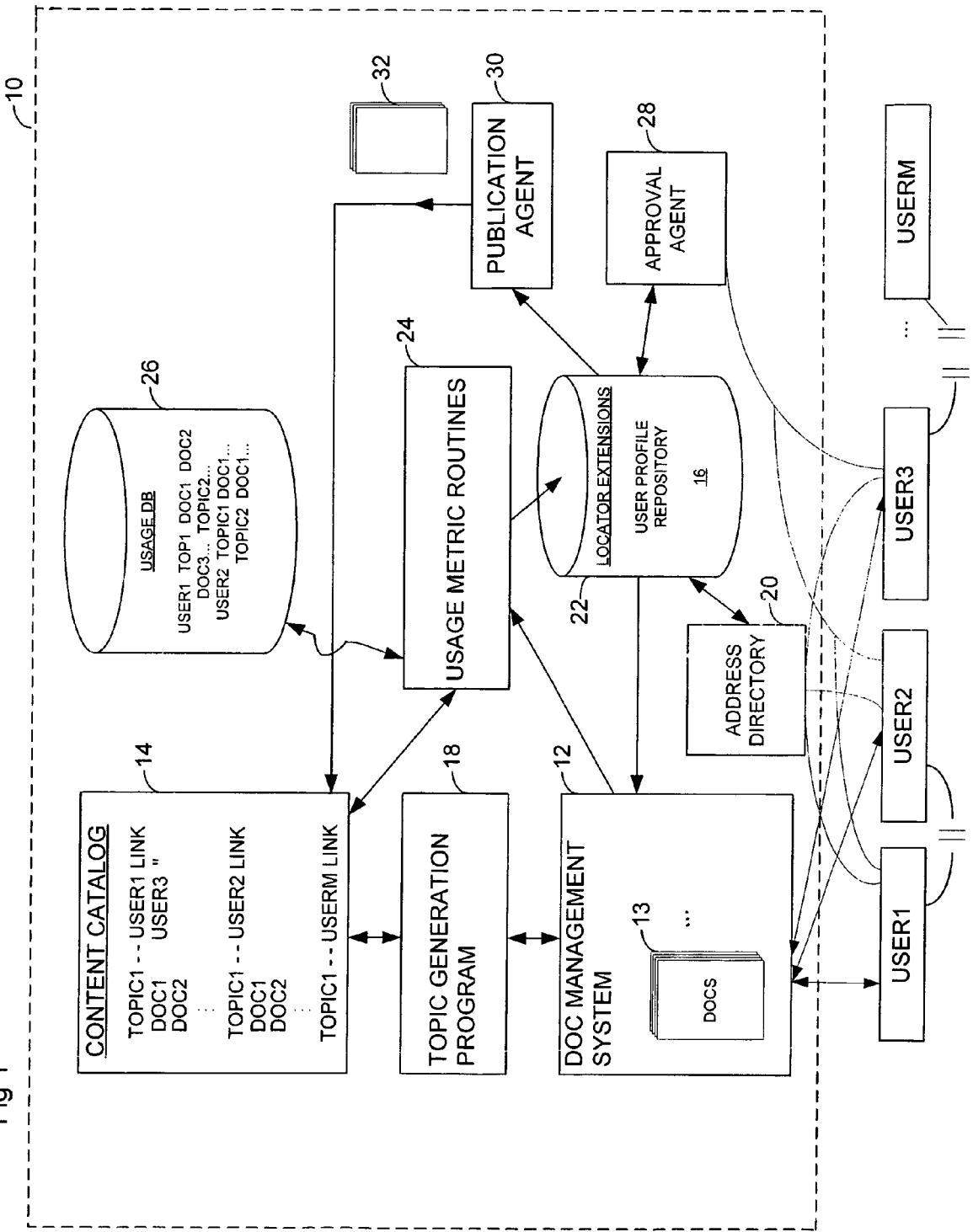
FIG. 1 is a block diagram of an exemplary system for profiling users based upon document usage and updating a content catalog in accordance with one embodiment of the present invention.

Referring to FIG. 1, one embodiment of the system 10 of the present invention includes, among other things a document management system 12 for storing and administrating a plurality of documents 13, a content catalog 14, and a user profile repository 16. For purposes of this description, documents 13 include any types of files containing content such as database files, text documents, graphics, video or audio files, newsgroup files, online bulletin board files, Lotus NOTES documents, e-mail files, chat discussion files, etc., and the document management system 12 is a conventional application program for managing the documents. The system 10 is accessible to a plurality of users 11, who can create, access, edit, send, and otherwise manipulate or use the documents 13 through the document management system 12. In some embodiments, the system 10 may be implemented as a server and the users 11 as clients connectable to the server over an intranet, extranet or the Internet.

The content catalog 14 is hierarchical taxonomy or collection of content categories or topics with links to the documents 13. The content catalog includes a user interface for allowing browsing of the hierarchy or directly searching the topics for relevant documents. The content catalog 14 may be of the well-known type, sometimes referred to as a knowledge map, knowledge catalog or content taxonomy. Several public examples of a content catalogs exist on the Internet today, such as YAHOO! and the NETSCAPE Open Directory, and various vendors have toolsets for creating content catalogs for a corporate intranet, including GRAPEVINE, AUTONOMY, and OPENTEXT, etc.

A topic generation program 18 serves as an automatic multidimensional classification program to add new documents 13 to the collection in the content catalog 14. The topic generation program 18 may be of the type employed by web search engines to collect and classify various data. An example of such a program is described in U.S. Pat. No. 5,659,732, issued Aug. 19, 1997, entitled DOCUMENT RETRIEVAL OVER NETWORKS WHEREIN RANKING AND RELEVANCE SCORES ARE COMPUTED AT THE CLIENT FOR MULTIPLE DATABASE DOCUMENTS, which is hereby incorporated by reference into this application.

Alternatively, the topic generation program 18 uses a clustering algorithm, such as the k-means algorithm, to identify topics or categories for the documents 13 and compute relatedness or closeness values such as centroid vectors which indicate how relevant a given document is to the topic. Each document may be related in different degrees or strengths to different topics, and each topic may contain a number of documents. Such a program is described for a chat document in co-pending commonly owned U.S. patent application Ser. No. 09/143,075 titled METHOD AND SYSTEM FOR INFORMING USERS OF SUBJECTS OF DISCUSSION IN ON-LINE CHATS filed Aug. 28, 1998, and more generally in U.S. Pat. No. 5,924,105, issued Jul. 13, 1999, titled METHOD AND PRODUCT FOR DETERMINING SALIENT FEATURES FOR USE IN INFORMATION SEARCHING, both of which are hereby incorporated by reference into this application.

The user profile repository 16 is a directory containing data about users that is used as an authoritative source of organizational or group membership of an such as a company or otherwise as a repository of user profiles. As is known, a profile is a database record containing data about a user such as the user's identity, location, phone numbers, email addresses, security credentials, etc. The repository 16 may be a special profile database, such as a Lotus DOMINO database, or it may be an extension of an organization's existing directory, such as an LDAP directory or Microsoft's Exchange messaging directory. The system further contains an address directory 20 which receives information from users 11 and which is synchronized with the profile repository 16.

In accordance with the invention, the system 10 contains additional components to support the dynamic assessments of and publication about user affinities to topics. As shown in FIG. 1, additional profile extensions 22 are attached to the user profiles in the profile repository 16 to store information about each user's affinity to content. In one embodiment, the system 10 programmatically extends the design schema of the repository 16 to include affinity results, private and published as described below, and reads the directory to establish a list of target users. External users such as contract workers can be added to the directory for expertise tracking only, if desired. In some embodiments, the extended profile is based on the Lotus DOMINO directory and extensions to the directory's person record. In Microsoft environments, the DOMINO directory is synchronized with the MS Exchange directory and/or the Win2000 Active Directory, or both.

The additional information in the profile extensions include, in one embodiment, a ranked list of the top ten affinities for the user. As described further below, an affinity is a variable such as a number which represents the strength of a user's connection to a topic as represented by the user's activities on various of the documents 13, and may include additional information as described below. Also as explained further below, the user is provided control over maintenance, approval and publication of affinities.

The affinities are generated by usage metric software routines 24 which gather document metadata from the document management system 12 and content catalog 14, stores it in compact form in a relational usage database 26, and analyzes the stored data in accordance with a desired algorithm. As shown in FIG. 1, the document metadata stored in the usage database 26 includes users who nave performed activities over the system 10, documents created by, attributed to, or otherwise used by the users, as determined from the document management system 12, and topics assigned to those documents as determined from the content catalog 14 as described above. The usage metrics 24 use the stored data to generate affinities between topics and users and under certain conditions store those affinities in the profile extensions 22.

The system further includes an approval agent 28, which is a software routine that monitors profiles for affinities and requests approval from users to publish their affinities so other users may become aware of them. A publication agent 30 is a software routine which publishes approved affinities to the content catalog 14 by either inserting the user profiles 32 for the approved affinities into the catalog 14 or creating links to the user profiles 32 for the approved affinities to the topics associated with the affinities in the catalog 14.

Figure 2:
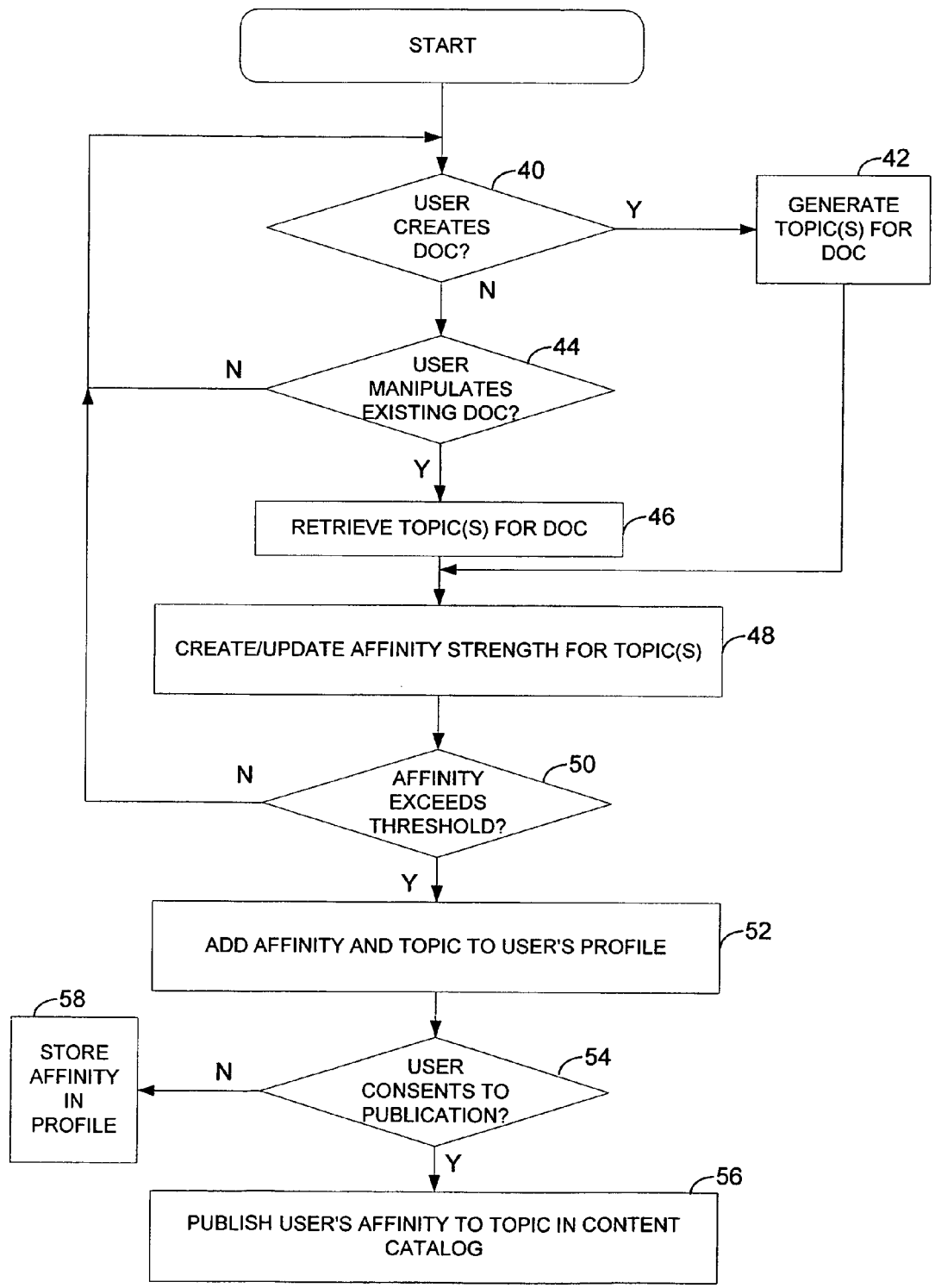
FIG. 2 is flow chart showing a general process of profiling users performed by the system shown in FIG. 1.

An exemplary process performed by the system of FIG. 1 is described generally with reference to FIG. 2 and then more particularly with reference to FIGS. 3A–3D. If a user creates a new document, step 40, one or more topics are generated for the document, step 42. If a user manipulates an existing document, the one or more previously assigned topics contained in the content catalog are retrieved, step 46. In some embodiments, certain users, such as system administrators who access many documents, may be identified as nonaffinity generating and thus their activities would be ignored. The affinity strength representing the relationship between each of the topics assigned to the document is updated to reflect the user's increased affinity to the topics, step 46. In a simple embodiment, the affinity strength is represented an integer which is incremented for each document created or used by the user. More complex embodiments, such as the one described below, consider a variety of additional factors including the document's closeness to each topic, the frequency with which the user accesses documents in this topic, and the level of affinity by other users to the same topic. That is, the closer the document is to the topic; the more frequently the user accesses documents in the topic; and the lower the general level of affinity by others—the greater the user's increase in affinity strength will be.

If the affinity strength reaches or exceeds a threshold, step 50, which threshold may be predefined or set dynamically depending upon the circumstances, the affinity is added to the user's extended profile, step 52. If the user consents to publication of the affinity, step 54, the affinity is published to the content catalog, step 56. Other users who perform searches for the topic through the content catalog are then informed of this user's affinity to and potential status as an expert in the topic. If the user does not approve publication of the affinity, the affinity is stored in the user's extended profile, step 58, for use in identifying the affinity as nonapproved to thereby prevent continuous requests for approval or to serve as a basis for comparison as the affinity strength increases to support an additional request for approval.

Figure 3A:
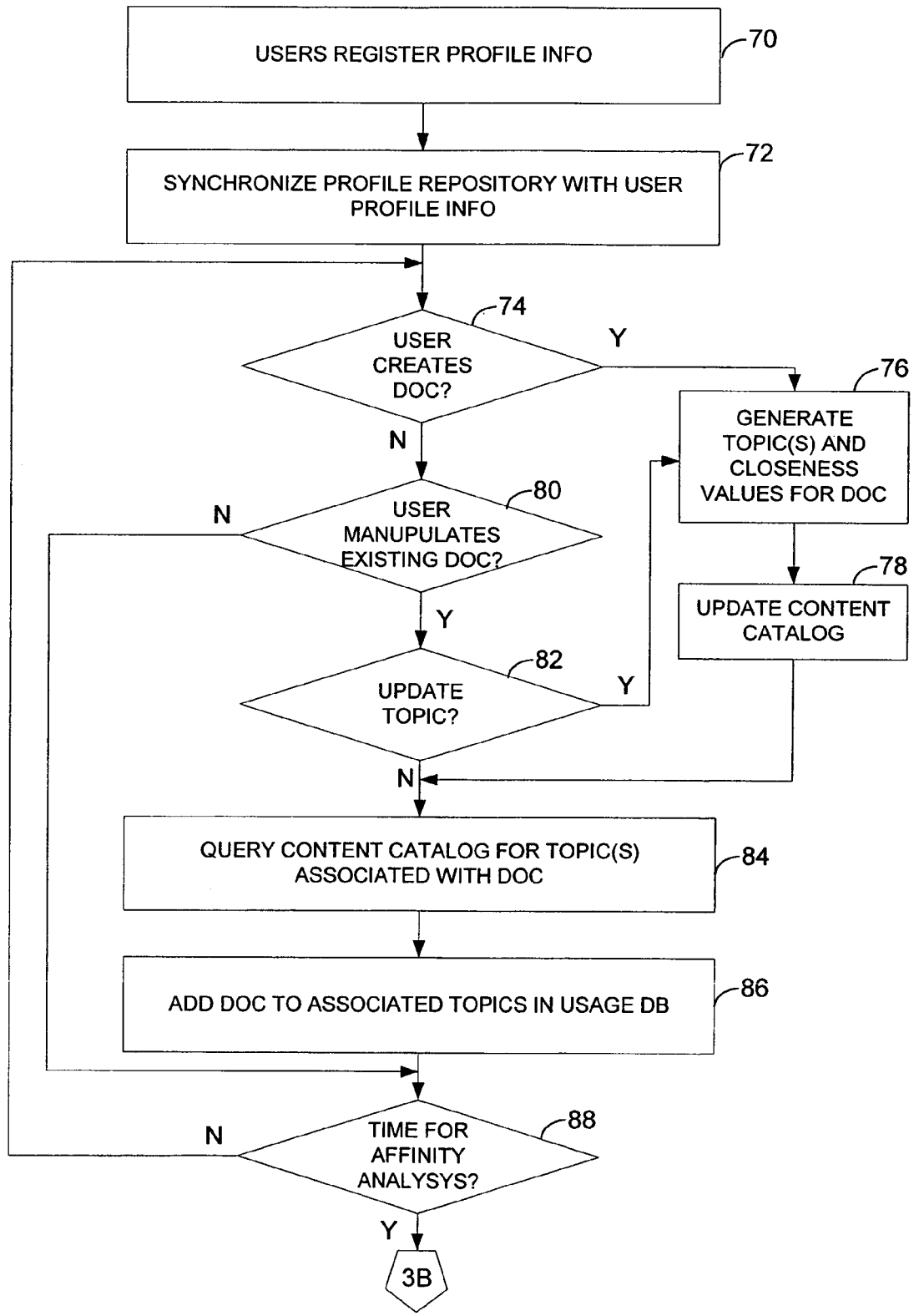
FIGS. 3A–3D contain a flow chart showing the process of profiling users in greater detail in accordance with one embodiment of the present invention.
Figure 3B:
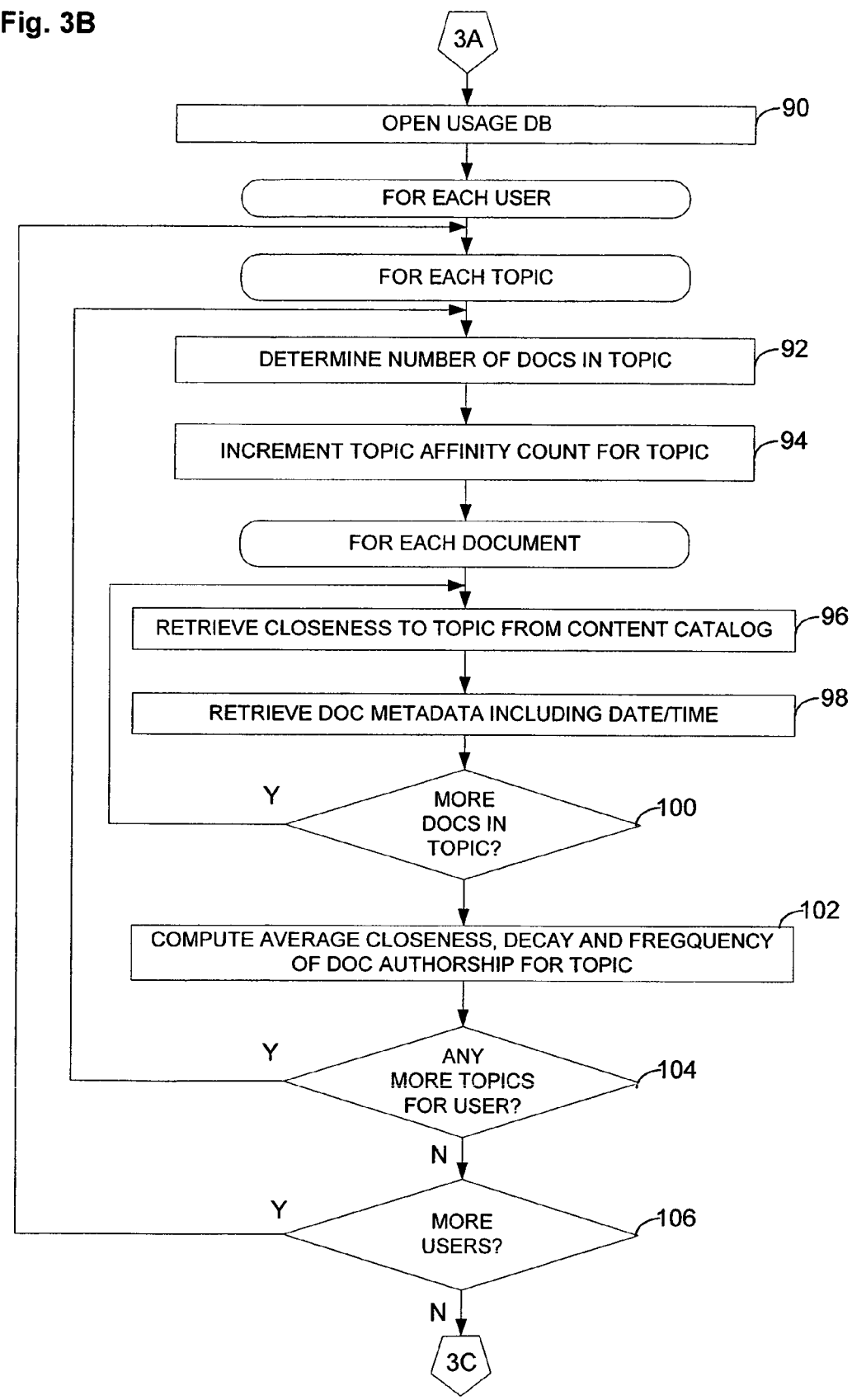
Figure 3C:
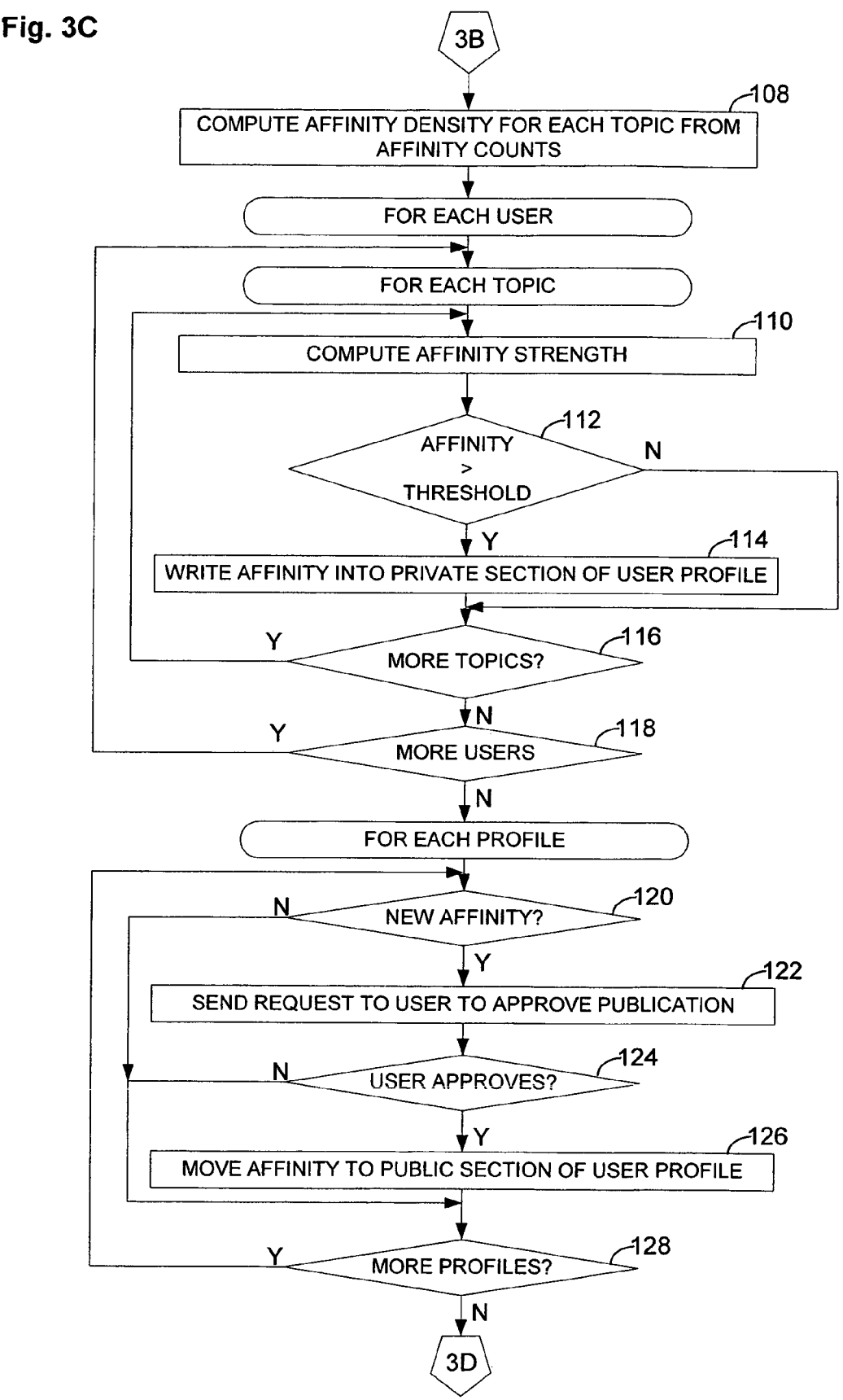
Figure 3D:
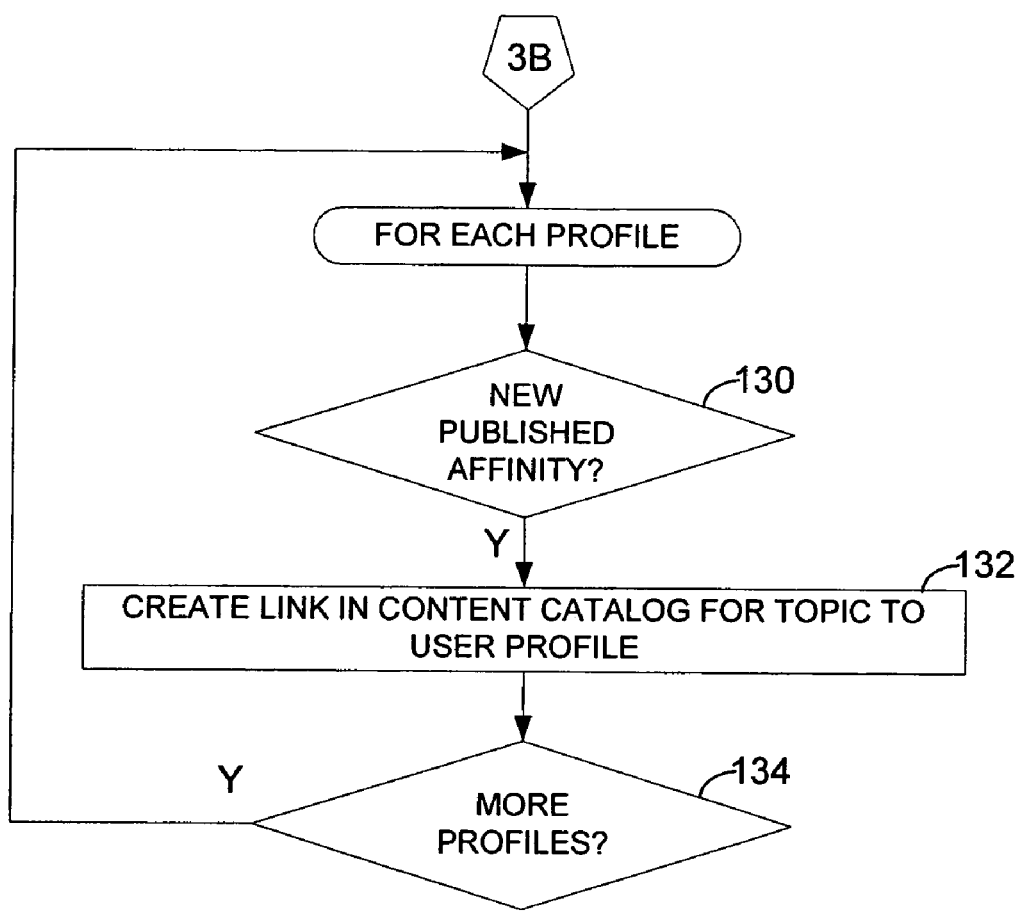

Referring now to FIG. 3A, a more detailed description of the process starts with users of the system registering their profile information in the address directory, step 70. The profile repository is synchronized with the address directory, step 72, to establish a reliable, authoritative source of user profile information. The profile repository reflects the community of expertise that the system 10 will create affinities for, and may include people outside of an organization who are not in the directory.

If a user creates a new document, step 74, the topic generator generates one or more topics and closeness values, such as centroid vectors, between each topic and the document, step 76. It further updates the content catalog with the new topic/document relationships, step 78.

In addition to authorship, the system 10 can provide a deeper, more expansive and more accurate set of affinities by profiling the user's use of other data sources such as email, discussion databases, and other collaborative tools by which content may be publicly accessed. Typically, this requires the user's permission and privacy control mechanisms. Once permitted, the system examines authorship, document actions such as filing, forwarding, deletion, etc., document reaction, e.g., responses/replies, content reuse, e.g., incorporation into new documents, and citations, e.g., 'bookmarking', created links to the source, etc., and builds a refined set of document valuations. When analyzed against the catalog topics, this additional evidence provides the user and the system with a detailed affinity set.

Thus, if a user accesses or manipulates an existing document, step 80, the system determines whether the topic(s) associated with the documents are to be updated as a result, e.g., the document is edited, step 82. If so, the topic generation process is initiated, step 76 and content catalog updated accordingly, step 78. As a result, the content catalog contains the most up-to-date representations of the topics associated with the affected document.

The usage metrics routines query the catalog for the topical categories that the document has been classified under, step 84, and uses the result to build or modify the association table or usage database of profiled authors and the documents that they have created or accessed, step 86. As explained above, a document may be 'soft classified' under multiple categories or topics depending on the range of content in the document. As documents are processed by the usage metrics component, typically after indexing and classification in the content catalog, the association table gets populated.

At a scheduled interval, step 88, the usage metrics component analyzes the associations for each profiled user and computes the strength of the association. Thus, the usage metrics routines open the usage database, step 90 (FIG. 3B), and, for each user in the usage table and for each topic associated with the user, finds the number of documents associated with the topic, step 92. A topic affinity count is incremented, step 94, which represents the number of affinities associated with the topic across all users, for use as explained below. For each document listed as associated with the topic, the closeness value between the document and topic is retrieved from the content catalog, step 96, and metadata about the document, including dates and times of creation and other access by the user is retrieved, step 98, from the document management system. This information is retrieved for each document until no documents remain for the topic, step 100. The usage metric routine then computes several numbers for the set of documents, including an average closeness value among documents in the topic, a decay time derived from the average amount of time that has passed since the documents were created/accessed, and a frequency by which the documents in the topic were created/accessed, step 102.

This process is repeated for each topic associated with the user until none remain, step 104, and for each user in the usage table until all users have been processed, step 106. An affinity density is then computed for each topic, step 108 (FIG. 3C), which represents the total instances of affinity across all users for the topic as a ratio of all topical affinities. This number helps indicate whether the topic will generate too many affinities and is thus too general to be of practical use to other users.

For each user and topic, the usage metrics routine computes an affinity strength, step 110. In one exemplary embodiment, this computation involves the variable retrieved and calculated above and is performed according to the following equation:

$$\text{Affinity strength} = (\text{Doc. \#} * \text{Freq.} * \text{Decay} * \text{CV}) / \text{TAD}$$

where:

Doc. # is a value representing the number of authored documents that are classified in the topic category (the more documents, the greater the affinity should be);

Freq. or Frequency is a value representing how often documents are authored by the user in this topic (greater frequency implies greater affinity);

Decay is a value derived inversely from the average age of the authorship of the documents (older documents having less value in the support of affinities);

CV or Centroid Vector is a value representing the closeness of the document content to the topical catalog category, as generated by the topic generation program (greater closeness values imply greater affinity); and TAD or Topic Affinity Density is a value representing the number of affinities published for each category across all users over the total number of affinities.

As one skilled in the art will recognize, a given affinity generation system may consider more or less factors and may weight them differently to reflect a desired goal within the set of users. For example, as described herein, the system preferably considers creation of and changes made to documents as affinity generating events. However, certain systems such as library systems or the world wide web may place greater emphasis on accessing or downloading documents and the time spent doing so rather than attempting to change documents. Such access may be the basis for computing affinity values. Similarly, in an electronic commerce system, events such as purchases, co-purchases, viewing or interacting with ads, or product inquiries may be used to compute affinity values.

If the affinity strength so computed is greater than a threshold, which may be dynamically determined by the system or set via a policy document, step 112, an affinity is written into a private section of the user's profile, step 114, so as to be accessible only by the user himself and not other users. The process of computing affinity strengths and determining their status is repeated for each topic, step 116, and each user, step 118.

At periodic intervals, the approval agent runs to identify and process new 'proposed' affinities in user profiles extensions, step 120. An affinity is determined to be new by the usage metrics routine by comparison with existing affinities stored in the user's profile, and a flag may be set to indicate its status as new. The agent sends the profiled user a request for approval of the affinity such as by email notification, step 122. The user may open his profile and decide to either publish this affinity or to suppress it, step 124. If approved for publication, the approval agent moves the affinity into a public section of the user's profile, step 126, so the affinity will be viewable and searchable in the user's profile. This process is repeated by the approval agent for all profiles having new affinities, step 128.

Periodically the catalog publication agent identifies and collects new 'published' affinities, step 130 (FIG. 3D) and creates link documents in the content catalog for the person which will provide a link to the person's profile, step 132. This is repeated for all profiles with new published affinities, step 134.

If the user chooses to suppress the affinity, it is kept in the profile and used as a filter to avoid repeated affinity proposals. In one implementation of the system, users are allowed to declare specific affinities. This is done through the content catalog interface, which directly writes the affinity in the 'published' state to the user's profile. System administrators can also designate affinities through the content catalog's taxonomy editor interface, which also writes the affinity to the user's profile. The process of approving and publishing affinities can be controlled from a policy document, where timeouts can be set to override user's who do not respond to the affinity notification. Until the affinities are approved and published by the user or via a policy proxy, they are kept in a coded numerical form for privacy within a restricted section of the profile document. The same treatment is applied to the affinity suppression list.

Until the affinity is published by the user, the affinity is stored in the user's profile in a numerical, tuple form to avoid detection by full text searches. The tuple contains a topic ID, a unique catalog ID for the topic (e.g., from DB/2 catalog); a source code; the affinity strength (e.g., a number from 0 to 1); a heuristic mask (a set of flags for privacy, publishing, etc.). A sample affinity tuple format is shown below is Table I:

TABLE I

AFFINITY TUPLES

| Component | Description |
|---|---|
| Topic ID | Unique topic ID |
| Source Code | Integer: |
| | 0 = Computed by usage metrics |
| | 1 = User declared |
| | 2 = Management designated |
| | 3–6 = reserved |
| | 7–9 = for third party use |
| Affinity strength | Float from 0 to 1, where: |
| | 0 = no affinity |
| | 1 = highest affinity (universal expert) |
| Heuristic mask | An extensible integer mask, where: |
| | First digit = Suppress state (1 = Keep private) |
| | Second digit = Review state (1 = reviewed or overwritten by policy) |
| | Third digit = Publish state (1 = Publish to catalog) |
| | For example: |
| | 000 = new, not reviewed or publishable |
| | 010 = reviewed, but not publishable |
| | 001 = published (used for declared affinity) |
| | 1XX = suppressed, but stored. |

This is the basic affinity of one embodiment. It is written into the 'Proposed Affinities' field of an extended user profile, one affinity per line, comma delimited, after the module checks to see that the topic ID isn't already present in the published or suppressed fields. The proposed field is hidden from public view where affinities are held pending user review. The usage metrics module does all the work and error checking.

From the content catalog a user can find people and documents by either browsing or searching. In either case, people will be represented in a manner similar to documents, either tersely (e.g., name, title, email, etc.) or verbosely (name, title, phone, email, location, Lotus SAMETIME status, etc.) An exemplary screen display showing documents and users associated in the content catalog with the topic "JavaScript" and located as a result of search through the catalog is shown in FIG. 4. As shown in FIG. 4, a document listing 150 is generated and displayed including closeness values expressed as percentages, and a user affinity or expert list 160 is generated and displayed with users ranked by affinity strength and identified in this embodiment only by name.

The names in the user expert list 160 are hyperlinked to user profiles, so that clicking on a selected user name would bring up the profile in a separate window, either a business card or full profile depending on context, with full profiles being brought up in embodiments with a more verbose listing of experts. An exemplary user profile screen display is shown in FIG. 5. Additionally, graphical hooks 180 for chat and email are integrated as shown in FIG. 5 by implementing links or icons wherever a person is represented in the content catalog, and an availability icon 190 is displayed indicating the person's availability. For example, the email addresses will be computed into a mailto: URL. The chat, email and availability tools may be supported by various existing software collaboration and messaging products such as Lotus SAMETIME or the like.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer implemented method for profiling a user based on the user's activity, the method comprising:
assigning one or more topics to each of a plurality of documents based at least in part upon content contained in the documents;
maintaining an affinity variable associated with the user for each of one or more of the topics assigned to a document attributed to the user;
determining whether a first affinity variable for the user for a given topic has reached a threshold; and
associating the user with the given topic for the first affinity variable which reaches the threshold;
wherein the step of maintaining the affinity variable comprises updating the affinity variable for a first topic for each document created by the user to which the first topic is assigned;
comprising updating the affinity variable for a topic based upon the user's manipulation of a document to which the topic is assigned;
wherein the user's manipulations comprise adding content to the document and deleting content from the document;
comprising assigning a topic to the document based upon content added to or deleted from the document; and
wherein the step of maintaining the affinity variable comprises updating the affinity variable for the topic assigned to the document based upon the added or deleted content.

2. A computer implemented method for profiling a user based on the user's activity the method comprising:
assigning one or more topics to each of a plurality of documents based at least in part upon content contained in the documents;
maintaining an affinity variable associated with the user for each of one or more of the topics assigned to a document attributed to the user;
determining whether a first affinity variable for the user for a given topic has reached a threshold; and
associating the user with the given topic for the first affinity variable which reaches the threshold;
wherein the step of maintaining the affinity variable comprises updating the affinity variable for a first topic for each document created by the user to which the first topic is assigned;
comprising updating the affinity variable for a topic based upon the user's manipulation of a document to which the topic is assigned;
comprising assigning one or more second topics to a document based upon content in the document following the user's manipulation thereof; and
wherein the step of updating the affinity variable comprises updating the affinity variable for the one or more second topics.

3. A computer implemented method for profiling a user based on the user's activity, the method comprising:
assigning one or more topics to each of a plurality of documents based at least in part upon content contained in the documents;
maintaining an affinity variable associated with the user for each of one or more of the topics assigned to a document attributed to the user;
determining whether a first affinity variable for the user for a given topic has reached a threshold; and
associating the user with the given topic for the first affinity variable which reaches the threshold;
comprising storing a content catalog accessible by a plurality of users, which content catalog contains topics associated with documents to which the topics are assigned
wherein the step of associating the user with the given topic comprises associating the user with the given topic contained in the content catalog;
wherein the step of maintaining the affinity variable comprises storing the affinity variable in a profile associated with the user;
comprising requesting the user's approval as a condition to associating the user with the given topic contained in the content catalog; and
comprising storing the first affinity variable in the user's profile if the user declines to approve association of the user with the given topic in the content catalog.

4. A computer implemented method for profiling a user based on the user's activity, the method comprising:
assigning one or more topics to each of a plurality of documents based at least in part upon content contained in the documents;
maintaining an affinity variable associated with the user for each of one or more of the topics assigned to a document attributed to the user;
determining whether a first affinity variable for the user for a given topic has reached a threshold; and
associating the user with the given topic for the first affinity variable which reaches the threshold;
wherein the step of maintaining the affinity variable comprises updating the affinity variable to reflect a passage of time;
wherein the affinity variable is numerical; and
wherein the step of maintaining the affinity variable comprises increasing the affinity variable for each topic assigned to a document attributed to the user and decreasing the affinity variable to reflect the passage of time.

5. A computer readable medium containing program code for, when executed by a computer, causing the computer to perform a method for profiling a user based on the user's activity, the method comprising:
assigning one or more topics to each of a plurality of documents based at least in part upon content contained in the documents;
maintaining an affinity variable associated with the user for each of one or more of the topics assigned to a document attributed to the user;
determining whether a first affinity variable for the user for a given topic has reached a threshold; and
associating the user with the given topic for the first affinity variable which reaches the threshold;
wherein the step of maintaining the affinity variable comprises updating the affinity variable for a first topic for each document created by the user to which the first topic is assigned;
comprising updating the affinity variable for a topic based upon the user's manipulation of a document to which the topic is assigned;

wherein the user's manipulations comprise adding content to the document and deleting content from the document;

comprising assigning a topic to the document based upon content added to or deleted from the document; and wherein the step of maintaining the affinity variable comprises updating the affinity variable for the topic assigned to the document based upon the added or deleted content.

6. A computer readable medium containing program code for, when executed by a computer, causing the computer to perform a method for profiling a user based on the user's activity, the method comprising:

assigning one or more topics to each of a plurality of documents based at least in part upon content contained in the documents;

maintaining an affinity variable associated with the user for each of one or more of the topics assigned to a document attributed to the user;

determining whether a first affinity variable for the user for a given topic has reached a threshold; and associating the user with the given topic for the first affinity variable which reaches the threshold;

wherein the step of maintaining the affinity variable comprises updating the affinity variable for a first topic for each document created by the user to which the first topic is assigned;

comprising updating the affinity variable for a topic based upon the user's manipulation of a document to which the topic is assigned;

comprising assigning one or more second topics to a document based upon content in the document following the user's manipulation thereof; and wherein the step of updating the affinity variable comprises updating the affinity variable for the one or more second topics.

7. A computer readable medium containing program code for, when executed by a computer, causing the computer to perform a method for profiling a user based on the user's activity the method comprising:

assigning one or more topics to each of a plurality of documents based at least in part upon content contained in the documents;

maintaining an affinity variable associated with the user for each of one or more of the topics assigned to a document attributed to the user;

determining whether a first affinity variable for the user for a given topic has reached a threshold; and associating the user with the given topic for the first affinity variable which reaches the threshold.

comprising storing a content catalog accessible by a plurality of users, which content catalog contains topics associated with documents to which the topics are assigned;

wherein the step of associating the user with the given topic comprises associating the user with the given topic contained in the content catalog;

wherein the step of maintaining the affinity variable comprises storing the affinity variable in a profile associated with the user;

comprising requesting the user's approval as a condition to associating the user with the given topic contained in the content catalog; and comprising storing the first affinity variable in the user's profile if the user declines to approve association of the user with the given topic in the content catalog.

8. A computer readable medium containing program code for, when executed by a computer, causing the computer to perform a method for profiling a user based on the user's activity, the method comprising:

assigning one or more topics to each of a plurality of documents based at least in part upon content contained in the documents;

maintaining an affinity variable associated with the user for each of one or more of the topics assigned to a document attributed to the user;

determining whether a first affinity variable for the user for a given topic has reached a threshold; and associating the user with the given topic for the first affinity variable which reaches the threshold;

wherein the step of maintaining the affinity variable comprises updating the affinity variable to reflect a passage of time;

wherein the affinity variable is numerical; and wherein the step of maintaining the affinity variable comprises increasing the affinity variable for each topic assigned to a document attributed to the user and decreasing the affinity variable to reflect the passage of time.

* * * * *